June 2, 1925.
F. D. GOULD
AUTO TOP
Filed Oct. 12, 1921
1,540,262
3 Sheets-Sheet 2
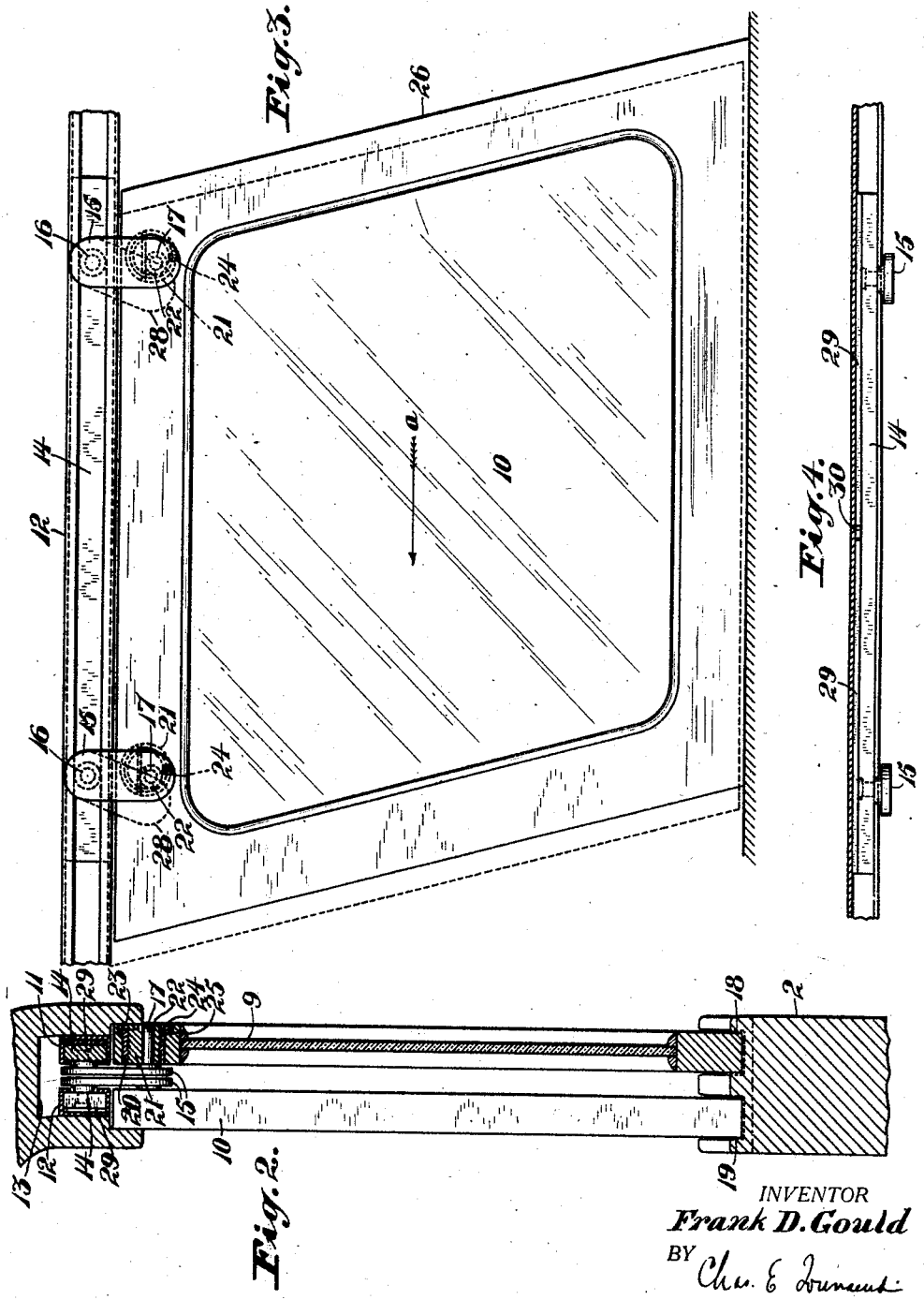
INVENTOR
*Frank D. Gould*
BY
ATTORNEY

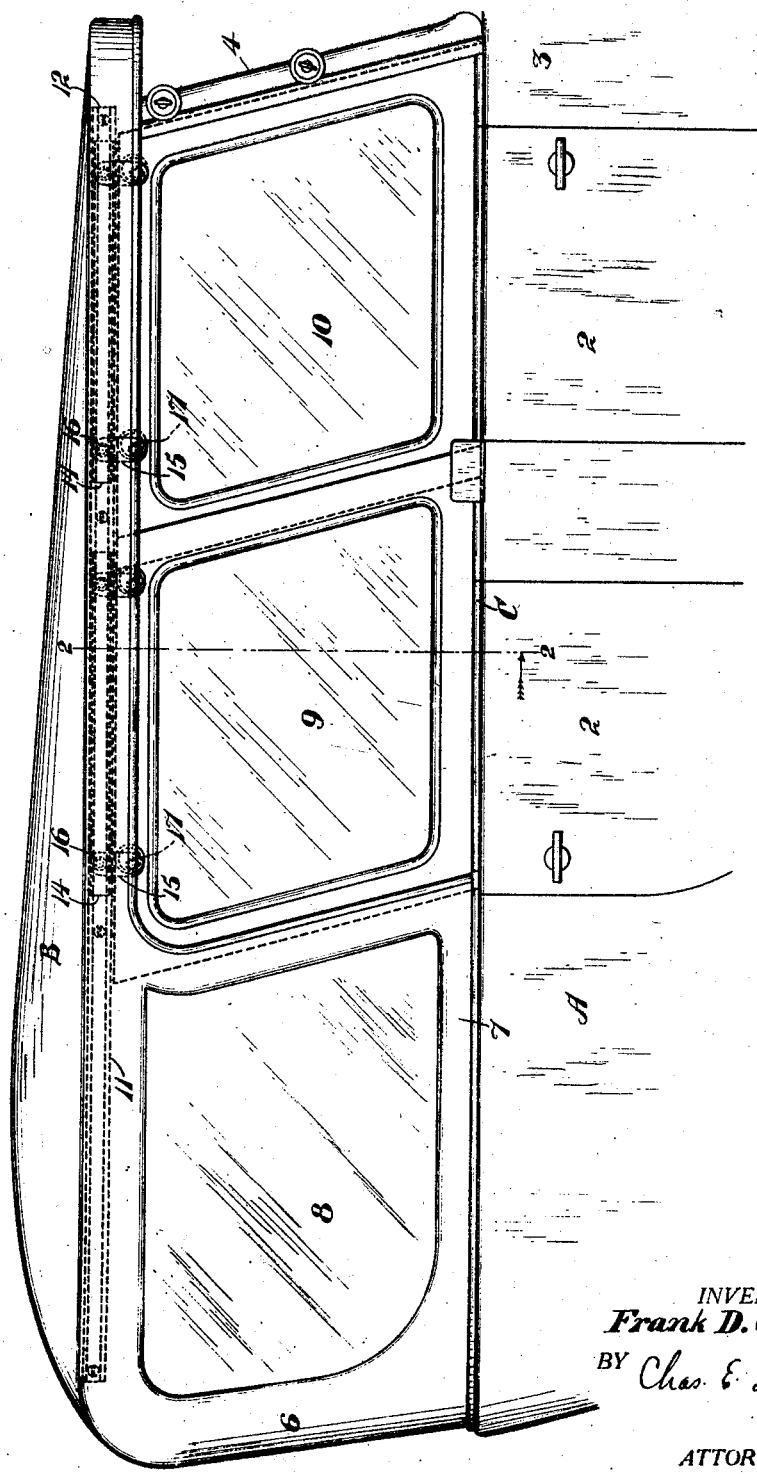

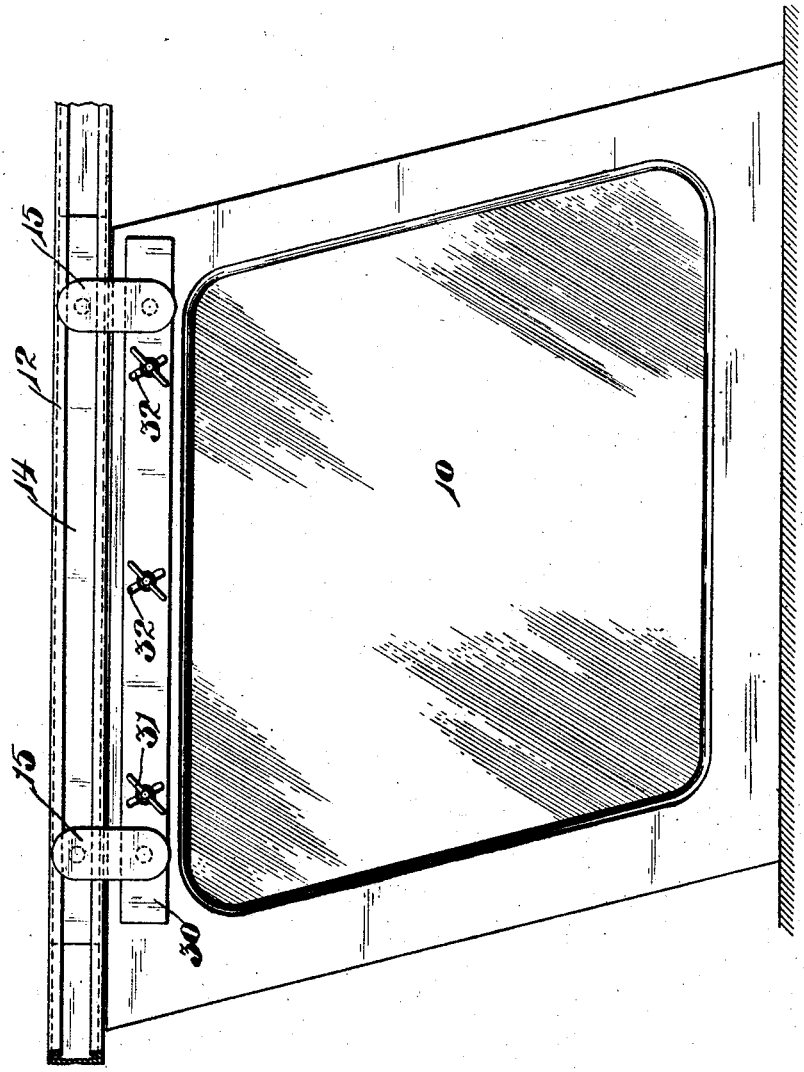

Patented June 2, 1925.

1,540,262

UNITED STATES PATENT OFFICE.

FRANK D. GOULD, OF OAKLAND, CALIFORNIA, ASSIGNOR TO F. D. GOULD COMPANY, OF SAN FRANCISCO, CALIFORNIA, A CORPORATION OF CALIFORNIA.

AUTO TOP.

Application filed October 12, 1921. Serial No. 507,234.

*To all whom it may concern:*

Be it known that I, FRANK D. GOULD, a citizen of the United States, residing at Oakland, in the county of Alameda and State of California, have invented new and useful Improvements in Auto Tops, of which the following is a specification.

This invention relates to automobile tops of the type employing horizontally sliding windows for effecting a closure of the space at each side, as exemplified in my prior application, Serial No. 345,785, filed December 18, 1919.

In the prior application above referred to the sliding window could not be locked in intermediate positions. Many users preferred to set the sliding windows at various intermediate positions to suit weather conditions, etc., and therefore it is desirable to have mechanism which will lock said sliding windows in all positions of adjustment, and likewise preventing rattling of the windows in any such positions.

In and by the present invention I have provided simple and easily operated mechanism which is effective to lock the sliding windows in various intermediate positions of adjustment and firmly retain the same against vibration or rattle. This result cannot be accomplished by the use of ordinary locking means, inasmuch as these windows in the course of their sliding movement should be raised above the top rail of the vehicle body for greater facility of movement and to prevent marring of the parts. The suspension mechanism for the windows as disclosed in the present application permits the windows to be elevated when moved horizontally and to be lowered again into contact with the top rail of the body when brought to rest at any position throughout the course of the movement of the window. This suspension mechanism embodies connections such that when the window is brought to rest in contact with the top rail of the body a locking action takes place which securely retains the window against vibration or accidental displacement.

Two forms which my invention may assume are exemplified in the following description and illustrated in the accompanying drawings, wherein:

Fig. 1 is a side elevation of the automobile top showing the windows extended.

Fig. 2 is an enlarged cross section on line 2—2, Fig. 1.

Fig. 3 is an enlarged side elevation of one of the windows showing the sliding support and the intermediate suspension and locking means.

Fig. 4 is a detail plan section of one of the tracks and the sliding support movable therein.

Fig. 5 shows a side elevation of one of the sliding windows with a modified form of suspension means therefor.

Referring to the drawings in detail, A indicates the body of an automobile, 2 the usual form of hinged doors, 3 the hood or forward portion of the car, 4 the windshield, and B the top in general.

The top here shown consists of a permanent rigid frame secured to the body and to the windshield. The shape of the top and the detail construction of the same forms no part of the present invention as this may be varied.

Formed as a portion of the top is a back section 6, and a pair of side sections 7, in which are mounted stationary windows 8, one side section and window being disposed on each side. Disposed on each side of the top is also a pair of sliding windows 9 and 10. These windows are arranged in pairs, one pair on each side and these windows are adapted to be moved rearwardly into alignment with the stationary windows 8, or to be extended forward of the stationary windows to partially or wholly enclose the car. The method of supporting these windows and locking the same, whether in extended or retracted position, forms the subject matter of the present invention.

The windows are supported from overhead tracks, indicated at 11 and 12, a pair of which is arranged in each side of the top. The top proper is channeled in each side, as at 13, to receive the tracks (see Fig. 2). The tracks are channel-shaped and are secured in any suitable manner within the channels 13. The track 11 supports the window 9 and the track 12 the window 10. A bar or shoe 14 is slidably mounted in each track and the windows proper are suspended from the bars by means of links generally indicated at 15. There is a pair of links for each window, one link being attached to each end of the window as shown in Figs.

1 and 3. The upper ends of the links are pivotally attached to the bars, as at 16, while the lower ends are pivotally attached to the windows proper, as at 17. The links have a toggle action with relation to the windows, as will hereinafter be described, to force the windows into engagement with guide channels 18 and 19 formed in the top of the body and on the doors, as generally indicated at C (see Fig. 1). The pivotal connection 17 formed between the lower end of the links and the windows permits the latter to be adjusted vertically. This connection consists of an internally threaded bushing 20 secured in the frame of the window in any suitable manner. Adapted to be received by the bushing is a threaded plug 21, and disposed eccentrically in the plug is a pin 22, to which the lower end of the link attaches. The plug 21 is turnably mounted in the bushing 20, due to the threaded connection formed between the same, and it is therefore possible to turn the plug one-half a turn or more within the respective bushings 20 to raise or lower the windows with relation to the guides 18 and 19. The plugs when turned to their desired position are locked as each plug is flanged, as at 23, and a locking screw 24 is provided which passes not only through the flange 23, but also a flange 25 formed on each bushing; said flanges being perforated and threaded to receive the screws 24.

To clearly illustrate the purpose of the sliding bars 14 and the combined suspending and locking mechanism interposed between the sliding bars and the windows, reference will be made to Fig. 3. For instance if it is desired to slide or move the window in the direction of arrow a, it is only necessary to grasp the forward edge of the window, indicated at 26, and to push it in the direction of arrow a. Such movement will cause the window to swing rearwardly and at the same time upwardly. The links will thus assume the dotted line position indicated at 28. The first movement imparted to the window is therefore a slight rearward movement and is simultaneously an upward movement due to the swinging movement or position assumed by the links. This upward movement forms a clearance between the lower edge of the window and the guide channel in which it travels, and thus leaves it free so that a continued movement may be transmitted in the direction of arrow a. The moment the window reaches the position desired, it is only necessary to give a slight pull in the reverse direction. The links will then straighten out and the window will swing downwardly into engagement with the bottom of the channel in which it travels, and considerable pressure will be exerted due to the toggle action or movement of the links, the amount of pressure exerted when the toggles assume an approximate vertical position being sufficient to lock the window and rigidly secure it against vibration and rattling. If the pressure or tension thus exerted is not sufficient, it can readily be increased by slightly turning or adjusting the position of the plugs 20, as any turning movement imparted to the plugs will either raise or lower the pins 22, thus increasing or decreasing the pressure between the lower edge of the windows and the guide channels in which they travel.

To insure release or upward movement of the windows whenever their position is changed, it is necessary that a slight friction be exerted on the sliding bars 14. Such friction is obtained by interposing a flat-leaf spring 29 between the sliding bar and the track. This leaf-spring is secured at its center portion, as at 30 to the bar 14, and the free ends of the spring, which have a tendency to expand outwardly, will thus frictionally engage the track and exert sufficient friction to prevent movement of the bar when the windows are being released. In other words when a window in locked position is to be extended or retracted, it is only necessary to grasp the window and exert a pull in the direction desired. Such pull will first impart a slight forward movement, and simultaneously a raising movement to the window, and thereafter a sliding movement will be transmitted to the bar 14 and the window proper; said movement being continued until the desired position is reached when the window is released and a reverse movement transmitted. This movement is very slight as it should be just sufficient to swing the links to an approximate vertical position. When such position is assumed, sufficient pressure will be exerted between the lower edge of the window and the guide channel to retain it; the pressure also being sufficient to prevent rattle or movement by vibration, etc.

From the foregoing it can be seen that an exceedingly simple mounting has been provided for each window, said mounting permitting extension or retraction of each window independently of the other, and most important of all permitting locking of any individual window at any point between the ends of the track sections supporting the same. The locking action of each window depends entirely upon the pressure exerted by the toggle movement of the links 15, and as wear, etc. takes place, it is obvious that adjustment of the plugs 20 is also an important feature, as such adjustment will take care of any wear or warping which may take place in the body or top proper.

A modified form of mounting for the window is shown in Fig. 5 and, from some standpoints, it is preferable to the one already described. This consists in the use of a bar 30 pivotally connected to the lower ends of the links 15. The window is in turn connected to the bar 30 by means of set screws 31 extending through inclined slots 32. The inclined slots permit the window to be adjusted vertically and the use of the bar 30 keeps the links in parallelism so that the window may be maintained in proper horizontal position at all times.

Having thus described my invention, what I claim and desire to secure by Letters Patent is—

1. In an auto top of the character described, an upper horizontal trackway, a bar slidably mounted in said trackway, a pair of links pivotally attached to the bar at their upper ends, a window pivotally attached to the lower ends of said links, and a lower guide and support for the window, said links permitting the window to rise slightly when sufficient pressure is applied directly to the window to slide the same horizontally along the trackway.

2. In an auto top of the character described, an upper trackway, a bar slidably mounted in said trackway, a pair of links pivotally attached to the bar at their upper ends, a window pivotally attached to the lower ends of said links, and a lower guide and support for the window, said links permitting the window to frictionally engage the lower guide when at rest and permitting the window to rise sufficiently to avoid such frictional engagement when sufficient pressure is applied to the window to slide the same on the trackway.

3. In an auto top of the character described, an upper trackway, a bar slidably mounted in said trackway, a pair of links pivotally attached to the bar at their upper ends, a window pivotally attached to the lower ends of said links, a lower guide and support for the window, and means permitting vertical adjustment of the window with relation to the links.

4. In an auto top of the character described, an upper trackway, a lower guideway, a bar slidably mounted in the trackway, a pair of links pivotally attached at their upper ends to the bar, a window pivotally attached to the lower ends of the links, said window being disposed between the trackway and the lower guideway and engageable with the lower guideway, means for maintaining a frictional resistance between the bar and the trackway, and means permitting vertical adjustment of the window with relation to the links.

5. In combination with the body and open-sided top of a vehicle, a horizontal track at the side of the top, pendant links, frictional sliding connections between the links and the track, a window suspended from said links and normally resting on the top of the body beneath, said links by their swinging movement permitting the window to be raised out of contact with the top of the body when sufficient force to overcome the said frictional connection is applied to the window in a direction to slide the same.

6. In combination with the body and open-sided top of a vehicle, a horizontal track at the side of the top, a bar slidably mounted on said track, pendant links pivotally connected to said bar, a second bar connecting said links together at their lower ends, and a window mounted on said second bar and normally resting on the top of the body beneath, said pendant links permitting the window to be raised out of contact with the top of the body when force is applied to the window in a direction and sufficient to slide the window.

7. In combination with the body and open-sided top of a vehicle, a horizontal track at the side of the top, a bar slidably mounted on said track, pendant links pivotally connected to said bar, a second bar connecting said links together at their lower ends, a window mounted on said second bar and normally resting on the top of the body beneath, said pendant links permitting the window to be raised out of contact with the top of the body when force is applied in a direction to slide the window, and connecting means between said window and the second bar adjustable to vary the vertical position of the window.

FRANK D. GOULD.